United States Patent
Shibata et al.

(10) Patent No.: US 7,471,642 B2
(45) Date of Patent: Dec. 30, 2008

(54) COMMUNICATION TERMINAL, LOAD DISTRIBUTION METHOD AND LOAD DISTRIBUTION PROCESSING PROGRAM

(75) Inventors: Shunichi Shibata, Yokohama (JP); Kouji Ueda, Yokohama (JP); Kouji Yoshioka, Yokohama (JP); Ryuichi Ebuchi, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 781 days.

(21) Appl. No.: 10/954,998

(22) Filed: Sep. 30, 2004

(65) Prior Publication Data

US 2005/0213573 A1  Sep. 29, 2005

(30) Foreign Application Priority Data

Mar. 24, 2004 (JP) .............................. 2004-086455

(51) Int. Cl.
*H04L 12/26* (2006.01)
(52) U.S. Cl. .................... 370/253; 370/401; 370/474
(58) Field of Classification Search ................. 370/252, 370/253, 229, 230, 389, 474; 718/105
See application file for complete search history.

(56) References Cited

U.S. PATENT DOCUMENTS

| | | | | |
|---|---|---|---|---|
| 6,888,797 B1* | 5/2005 | Cao et al. | ................... | 370/235 |
| 7,003,574 B1* | 2/2006 | Bahl | ........................ | 709/228 |
| 2002/0012319 A1* | 1/2002 | Rochberger et al. | ......... | 370/229 |
| 2002/0154601 A1* | 10/2002 | Kawasaki et al. | ........... | 370/229 |
| 2004/0258073 A1* | 12/2004 | Alexander et al. | ....... | 370/395.5 |

FOREIGN PATENT DOCUMENTS

JP  2000-013439  1/2000

* cited by examiner

*Primary Examiner*—Gary Mui
(74) *Attorney, Agent, or Firm*—Katten Muchin Rosenman LLP

(57) ABSTRACT

A communication terminal which sends a frame to another terminal when performing a load distribution process using load distribution information appended to a frame that is sent/received between terminals within a communication network, the communication terminal comprises: a communication control part that specifies a sending port used for sending the frame; a load distribution information originating side designation part that stores load distribution structuring information, which is to be appended to the frame and used for generating the load distribution information, by relating to a sending port; a load distribution information transfer processing part that, when the sending port is specified, retrieves the load distribution structuring information corresponding to the determined sending port from the load distribution information originating side designation part; a send information setting part that structures the frame based on the load distribution structuring information and a load distribution information setting format; and a send frame processing part that sends out the structured frame from the sending port.

19 Claims, 19 Drawing Sheets

FIG. 3

| SENDING PORT | ETHER TYPE | LOAD DISTRIBUTION KEY CALCULATION PROCESSING METHOD | LOAD DISTRIBUTION KEY |
|---|---|---|---|
| 0 | A000 | 1 | — |
| 1 | A900 | 1 | — |
| 2 | AA00 | — | 1 |
| | | | |
| | | | |
| | | | |

| RECEIVING PORT | ETHER TYPE | DESCENDANT STATION TRANSFER |
|---|---|---|
| m | A900 | — |
| | | |
| | | |
| | | |
| | | |
| | | |

| LOAD DISTRIBUTION KEY | SENDING PORT |
|---|---|
| 0 | i |
| 1 | j |
|  |  |
|  |  |
|  |  |
|  |  |

| SENDING PORT | ETHER TYPE | LOAD DISTRIBUTION KEY CALCULATION PROCESSING METHOD | LOAD DISTRIBUTION KEY |
|---|---|---|---|
| 0 | AA00 | 1 | 1 |
| | | | |
| | | | |
| | | | |
| | | | |
| | | | |

| RECEIVING PORT | ETHER TYPE | DESCENDANT STATION TRANSFER |
|---|---|---|
| m | AA00 | — |
| n | AA00 | — |
|  |  |  |
|  |  |  |
|  |  |  |
|  |  |  |

| LOAD DISTRIBUTION KEY | SENDING PORT |
|---|---|
| 0 | i |
| 1 | j |
|  |  |
|  |  |
|  |  |
|  |  |

| RECEIVING PORT | ETHER TYPE | DESCENDANT STATION TRANSFER |
|---|---|---|
| m | A900 | PERFORMED |
|  |  |  |
|  |  |  |
|  |  |  |
|  |  |  |
|  |  |  |

| RECEIVING PORT | ETHER TYPE | DESCENDANT STATION TRANSFER | |
|---|---|---|---|
| n | A900 | — | 15-1a |
| o | A900 | — | |
| | | | |
| | | | |
| | | | |
| | | | |

FIG. 19

| LOAD DISTRIBUTION KEY | SENDING PORT |
|---|---|
| 0 | o |
| 1 | p |
|  |  |
|  |  |
|  |  |
|  |  |

15-1b

COMMUNICATION TERMINAL, LOAD DISTRIBUTION METHOD AND LOAD DISTRIBUTION PROCESSING PROGRAM

BACKGROUND OF THE INVENTION

The invention relates to a technique of distributing loads when a frame is sent/received between terminals within a communication network.

In recent years, a general LAN (Local Area Network) network has improved so much that information can be transmitted therethrough over an increasing distance. Accordingly, it becomes possible to use a network adopting the LAN in a wide range area as compared with the conventional use in as narrow a range as within premises.

Further, a LAN technology for use in a wide range area allows a communications provider (carrier) to provide a service to provide LAN network communications whose typical examples include a wide-area LAN service. The LAN technology also allows an ISP (Internet Services Provider) to use a LAN to build a regional network serving as a service network for connection to the Internet.

Even in the case where the communications provider operates business using such a LAN network, which may cause expansion of access areas or connections made by an indefinite number of subscribers, there is a demand for a load distribution function equivalent to a function performed in the conventional LAN network through an upper protocol.

In addition, for expansion of the LAN network, instead of expansion using a simple layer 2 switch, there is provided a technology in which MPLS (Multi Protocol Label Switching) is used to encapsulate a frame and an MPLS network, such as a VPLS (Virtual Private LAN Segment), is set as a single switch.

In terms of a process of distributing loads within a network, there is provided a device for a load distribution process such as MPLS-TE (Terminal Equipment). In terms of a filter function used for a load distribution process, there is provided a device having, for example, a MAC (Media Access Control) address filtering function. The functions for performing such a load distribution process include identification of a traffic that is flowing. The functions also include selection of a path that is logically equal to and physically different from the original path depending on an attribute of the traffic.

In the LAN network technology, a load distribution key (load distribution information) is used for identification of the traffic attribute. The load distribution key is obtained by applying distribution to MAC addresses indicating the source/destination of a traffic frame based on a hash calculation. This is because the load distribution key allows equal distribution owing to a statistical multiplexing effect when the number of combinations of MAC addresses increases to some extent.

Alternatively, as a method of distributing loads in a network upper than a LAN network, there is a method of setting a logical address defined in the upper network as the load distribution key.

Note that as the prior art relating to the invention, there is, for example, a technique as disclosed in Patent document 1 described below.

[Patent Document 1] JP 2000-13439 A

DISCLOSURE OF THE INVENTION

However, the following problems lie in the technique.

In a switching network using MPLS, load distribution is performed based on a MAC address received on a node side. However, when there is a router on the side of a user using the network, a MAC address of the router is used for load distribution. In that case, frames from terminals under the router are represented by a single MAC address irrespective of which terminal each frame is sent from. Therefore, the case cannot produce enough statistical multiplexing effects. In the network of the case, traffics deviate between routes for load distribution. Such a load distribution process using a MAC address causes a problem in that a redundant bandwidth needs to be ensured in terms of equipment investments, which lifts costs for operating a network.

Alternatively, there is a method of applying to a LAN network a load distribution process using information defined by an upper protocol (for example, an IP (Internet Protocol) address). However, in the case of using the method, a general LAN network cannot have limitations on the upper protocols. Accordingly, when the network is operated by mounting products compatible to many upper protocols, settings corresponding to a plurality of upper protocols are required for each load distribution node. In such a case, products or networks compatible to many upper protocols are operated with increased costs as compared with prior arts.

Also, in the case of executing a process such as load distribution using a hash, a designer or operator of the LAN network finds it difficult to grasp which route a packet for each individual user is directed to. This is because a MAC address is uniquely provided to hardware such as a LAN card. Thus, in order to grasp the relationship between each individual user and a MAC address correctly, there is no other way but to perform a survey by inquiry to all users or the like. In addition, it is practically difficult in the case to grasp that a user has replaced hardware.

Furthermore, there is another possible method for a load distribution process using a VLAN (Virtual LAN) or the like for identifying a subscriber. However, the VLAN is originally a technique intended for a segmenting process, and thus cannot be applied to all cases.

SUMMARY OF THE INVENTION

The invention has been made in view of such problems, and therefore has an object to provide a technique capable of operating a load distribution process for frames in a communication network with efficiency and accuracy. The invention has another object to provide a technique allowing a process corresponding to each user to be performed accurately upon a load distribution process for frames in a communication network. The invention has further another object to provide a technique allowing a load distribution process for frames in a communication network to be performed while suppressing various costs required for equipment investments and the like.

In order to achieve the objects, the following measures are provided according to the invention.

That is, according to the invention, there is provided a communication terminal which sends a frame to another terminal when performing a load distribution process using load distribution information appended to a frame that is sent/received between terminals within a communication network, the communication terminal comprising: a communication control part that specifies a sending port used for sending the frame; a load distribution information originating side designation part that stores load distribution structuring information, which is to be appended to the frame and used for generating the load distribution information, by relating to a sending port; a load distribution information transfer processing part that, when the sending port is specified, retrieves the load distribution structuring information corresponding to the determined sending port from the load distribution information originating side designation part; a send information setting part that structures the frame based on the load distribution structuring information and a load distribution information setting format; and a send frame processing part that sends out the structured frame from the sending port.

In the invention, based on the load distribution structuring information predetermined by relating to a sending port and the load distribution information setting format, the load distribution information, which defines how to handle load distribution upon frame transfer, is specified, and a frame containing the load distribution information is structured and then transferred to another terminal.

Therefore, according to the invention, the information, which allows the load distribution process for frames in a communication network to be implemented with efficiency and accuracy, can be transmitted to another terminal. Thus, the invention allows the load distribution process for frames in a communication network to be implemented with efficiency and accuracy. Further, according to the invention, there can be provided a technique for transmitting the load distribution information to another terminal, thereby allowing the load distribution process for frames in a communication network to be implemented for each individual user with accuracy. Furthermore, according to the invention, there can be provided a technique for transmission of load distribution information based on which a load distribution process is implemented while various costs required for equipment investments and the like are suppressed.

Further, according to the invention, the communication terminal may further include a load distribution information determination processing part that calculates load distribution information, which defines a load distribution process to be performed on another terminal, based on the load distribution structuring information, and the load distribution structuring information may contain: identification information, which is to be appended to a frame together with the load distribution information and specifies the load distribution information on the frame; and information indicating a method of calculating the load distribution information.

Further, according to the invention, the load distribution structuring information may contain: identification information, which is to be appended to a frame together with the load distribution information and specifies the load distribution information on the frame; and load distribution information to be sent to the other terminal.

Further, the invention can be specified as a communication terminal which receives a frame from another terminal when performing a load distribution process using load distribution information appended to a frame that is sent/received between terminals within a communication network, the communication terminal comprising: a load distribution information receiving side designation part that previously stores identification information, which specifies load distribution information of the received frame, by relating to a receiving port; a retrieval part that retrieves, based on the receiving port through which a frame has been received, identification information corresponding to the frame which is stored in the load distribution information receiving side designation part; a received information extraction part that, when the identification information is set in the frame, extracts the load distribution information specified by the identification information from within the received frame; a load distribution processing part that, when the identification information is not set in the frame, calculates load distribution information based on a predetermined load distribution calculation method; and sending port specifying part that, when the frame is sent to a descendant terminal, specifies a sending port of the frame based on the load distribution information.

According to the invention, when a frame is received in a communication network, a sending port through which the frame is to be transferred is specified based on information that is previously registered by relating to the frame.

Therefore, according to the invention, the sending port is specified for each individual frame that has been received, so that a technique can be provided which allows a load distribution process for frames in a communication network to be implemented with efficiency and accuracy. Further, according to the invention, the received individual frames can be processed respectively according to different pieces of load distribution information. Accordingly, the invention provides a technique for implementing the process corresponding to each individual user with accuracy when performing the load distribution process for frames in a communication network. Further, according to the invention, the load distribution information can be attained so as to correspond to each individual frame, making it possible to provide a technique for implementing the load distribution process while various costs required for equipment investments and the like are suppressed.

Further, according to the invention, the load distribution information receiving side designation part includes transfer permission information that indicates whether or not load distribution information contained in the received frame is transferred together with the frame to a descendant terminal, and the load distribution processing part may use the transfer permission information to set the load distribution information to a frame to be transferred to the descendant terminal.

Note that the invention may provide a program for implementing any of the functions described above. Further, the invention may allow the program to be recorded on a storage medium readable by a computer. Further, the invention may provide a device that implements the functions described above by combining any functions of a process performed upon frame sending and a process performed upon frame receiving.

DESCRIPTION OF THE DRAWINGS

FIG. 3 is an example of a load distribution key originating side information table.

FIG. 9 is a load distribution key originating side information table setting example of a node 6-2 according to Example 1.

FIG. 10 is a load distribution route determination table of the node 6-2 according to Example 1.

FIG. 13 is a load distribution key originating side information table setting example of a terminal of a subscriber B according to Example 2.

FIG. 14 is a load distribution key receiving side information table setting example of a node 10-1 according to Example 2.

FIG. 15 is a load distribution route determination table of the node 10-1 according to Example 2.

FIG. 17 is a load distribution key receiving side information table setting example of the node 6-2 according to Example 3.

FIG. 18 is a load distribution key receiving side information table setting example of a node 15-1 according to Example 3.

FIG. 19 is a load distribution route determination table of the node 15-1 according to Example 3.

DETAILED DESCRIPTION OF THE INVENTION

Hereinafter, description will be made of a best mode for carrying out the invention with reference to the drawings. A configuration according to the following embodiment mode is merely an example, and is not restricted to the configuration of the embodiment mode.

(Function Block of Communication Terminal)

Function blocks of a communication terminal according to the embodiment mode will be described. In the embodiment mode, the communication terminal is implemented by a computer in which a program capable of executing a load distribution process performed by a communication terminal according to the invention is installed. In the following description, the communication terminal has a function executed when receiving a transferred frame and a function executed when sending a received frame, which will be described separately. Note that in the following description, a communication terminal that has received a frame is referred to as a receiving node. Also, in the following description, a communication terminal that intends to send a frame is referred to as a sending node.

First description will be made of the function blocks of a sending node according to the embodiment mode.

Figure 1:
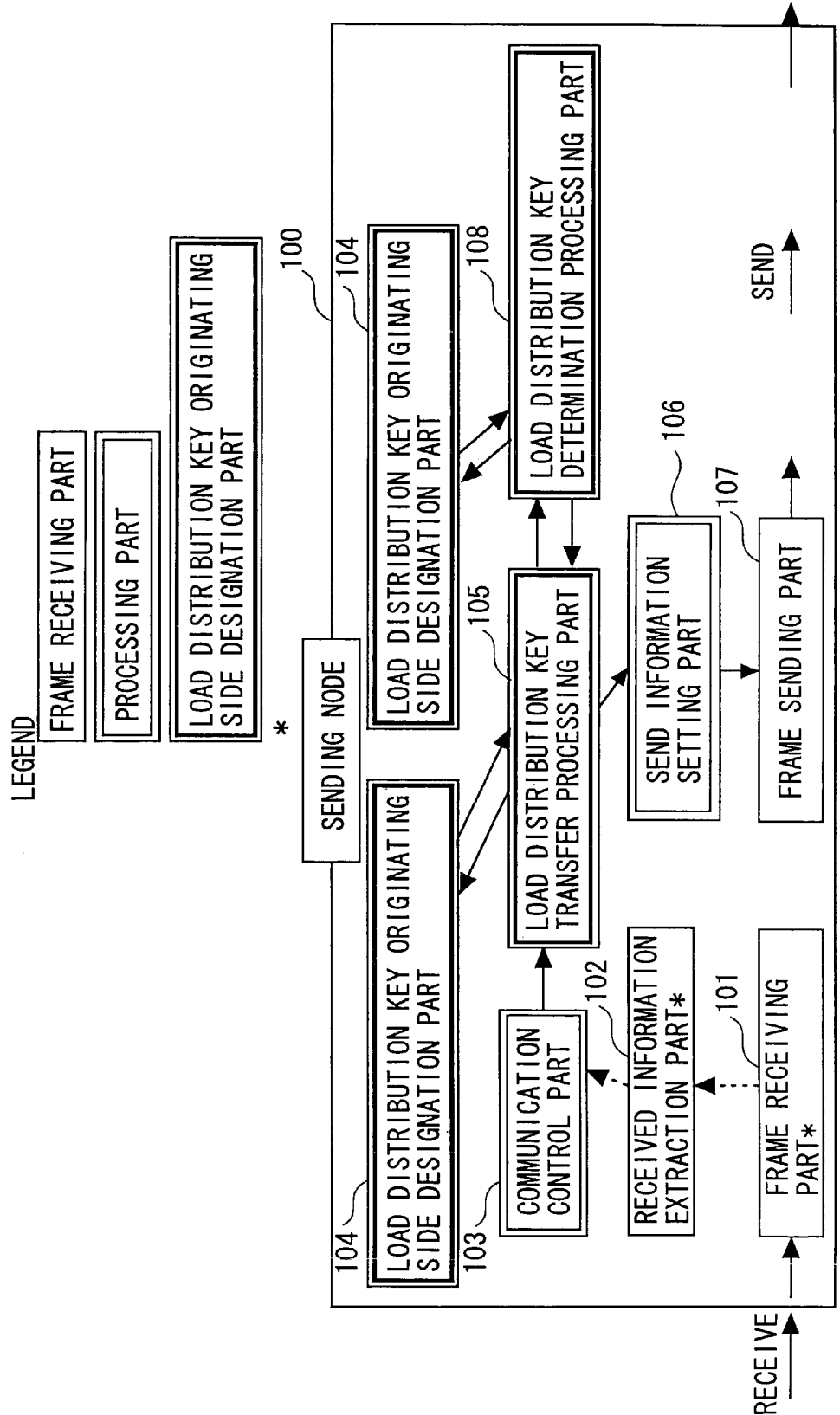
FIG. 1 is a function block diagram of a sending node according to an embodiment mode of the invention.

FIG. 1 is a block diagram illustrating the functions of a sending node 100. The sending node 100 includes a frame receiving part 101, a receive information extraction part 102, a communication control part 103, a load distribution key transfer processing part 105, a load distribution key originating side designation part 104, a send information setting part 106, a frame sending part 107, and a load distribution key determination processing part 108.

The frame receiving part 101 is the same function as that provided to an existing communication terminal. That is, the frame receiving part 101 executes a process of receiving a frame. The frame received by the frame receiving part 101 is passed to the receive information extraction part 102 together with receiving port information that specifies a port through which the frame has been received. Note that the frame receiving part 101 is a function necessary only for a node that relays a sent frame.

The receive information extraction part 102 is the same function as that provided to the existing communication terminal, but includes the following functions in the embodiment mode. The receive information extraction part 102 extracts, from the received frame, information to be used for a load distribution process, which includes MAC address information, VLAN information, and upper protocol information (if the sending node is a router or the like). The information extracted by the receive information extraction part 102 is passed to the load distribution key transfer processing part 105 together with the receiving port information. Note that the receive information extraction part 102 is a function necessary only for a node that relays the sent frame.

The communication control part 103 activates the load distribution key transfer processing part 105. In the case where the sending node 100 is a relaying node, the communication control part 103 determines the sending port for sending a received frame based on the destination MAC address, VLAN information, and upper protocol information (if the sending node is a router or the like) which have been received from the received information extraction part or communication control part. Alternatively, in the case where the sending node 100 is not a relaying node, the communication control part 103 is activated by an upper-level application. In that case, the communication control part 103 provides the load distribution key transfer processing part 105 with an instruction to send a frame to a sending port designated in advance.

The load distribution key originating side designation part 104 includes a memory. The memory of the load distribution key originating side designation part 104 includes a load distribution key originating side information table that stores, by relating to a sending port, an Ether Type (corresponding to identification information of the invention) used for recognizing information between nodes transferring a load distribution key, and a method of processing calculation of a load distribution key corresponding to the Ether Type. FIG. 3 is an example of such a load distribution key originating side information table 104a stored within the load distribution key originating side designation part 104. Note that the term "load distribution key" refers to information that is appended to a frame in order to specify contents of a transfer process, including a path for transferring the frame, when the load distribution process is performed in the network. Also, the load distribution key corresponds to the load distribution information of the invention.

Further, the load distribution key originating side information table 104a of the load distribution key originating side designation part 104 stores, by relating to a sending port, an Ether Type used for recognizing the load distribution information between nodes transferring a load distribution key, and the load distribution key corresponding to the Ether Type. Note that the load distribution key originating side designation part 104 operates through a command interface.

The load distribution key transfer processing part 105 searches the load distribution key originating side information table 104a based on the information on the sending port determined by the communication control part 103. If there is information registered in the load distribution key originating side information table 104a, the load distribution key transfer processing part 105 requests the load distribution key determination processing part 108 for determination of a load distribution key.

Also, the load distribution key transfer processing part 105 passes calculation results from the load distribution key determination processing part 108 and the Ether type obtained from the load distribution key originating side information table 104a to the send information setting part 106.

Alternatively, in the case where a load distribution key corresponding to a frame to be sent has been retrieved from the load distribution key originating side information table 104a, the load distribution key transfer processing part 105 passes the corresponding Ether type and the load distribution key to the send information setting part 106.

The load distribution key determination processing part 108 receives a request from the load distribution key transfer processing part 105, and searches the load distribution key originating side information table 104a using a sending port number as a search key. Then, the load distribution key determination processing part 108 calculates the load distribution key that specifies the load distribution process for the received frame from the source MAC address of the frame based on the predetermined method of processing calculation of a load distribution key (for example, a hash calculation based on a destination MAC address/source MAC address). After that, the load distribution key determination processing part 108 sends the results of the calculation of a load distribution key back to the load distribution key transfer processing part 105.

Figure 4:
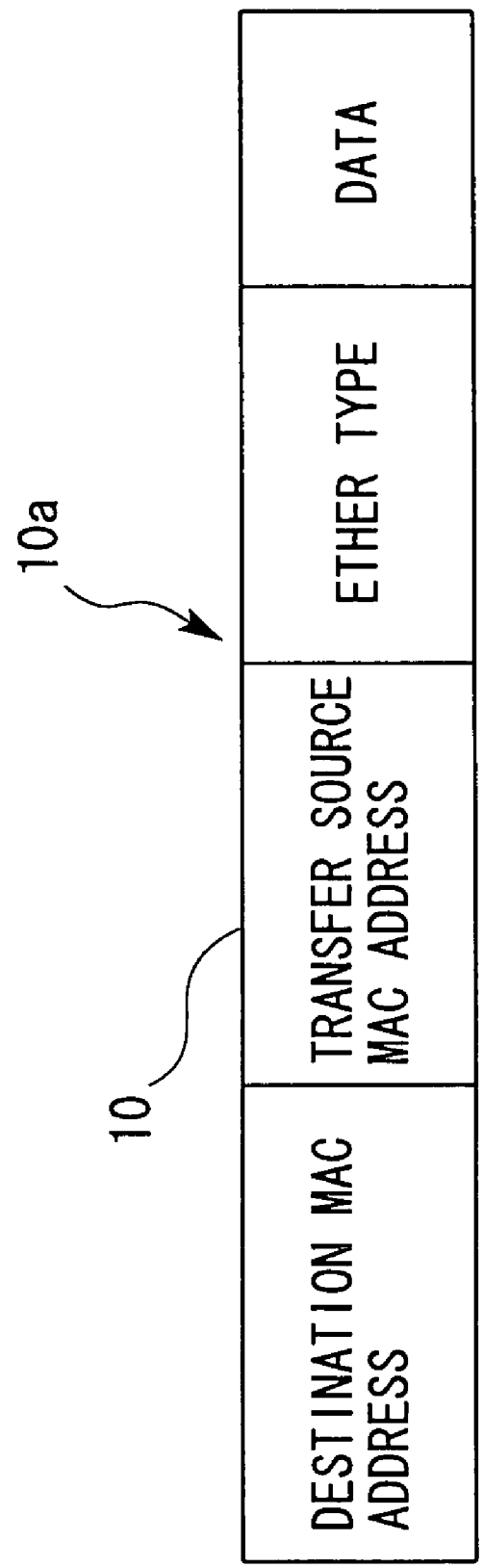
FIG. 4 is an example of an existing frame format.
Figure 5:
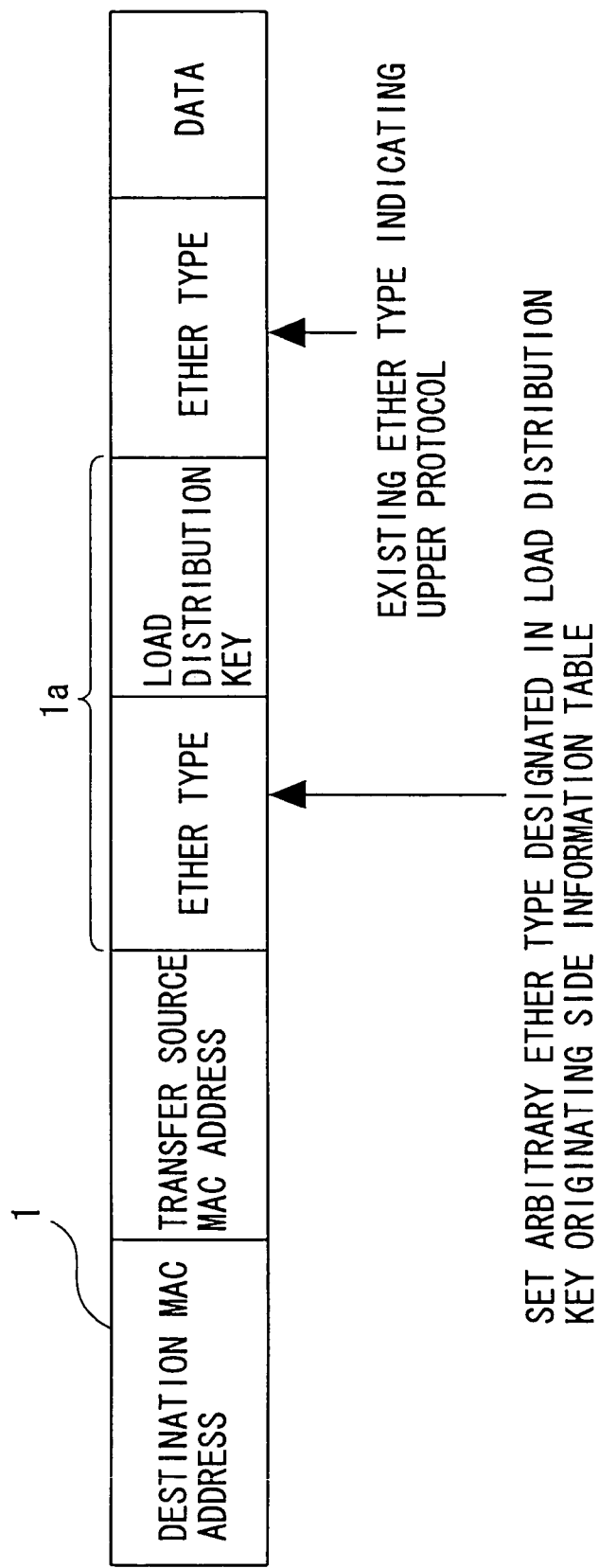
FIG. 5 is an example of a frame format with the load distribution key having been set.

The send information setting part 106 structures a frame to be sent based on the information from the load distribution key transfer processing part 105 as a frame containing a load distribution key. FIG. 4 shows an existing frame format 10 containing no load distribution key. In contrast, FIG. 5 shows a frame format 1 containing the load distribution key according to the embodiment. The frame format 1 containing a load distribution key inserts load distribution key and an Ether Type into an existing code (for example, the tag of a VLAN) provided to the existing frame format 10. The send information setting part 106 then structures the frame format 1 containing the load distribution key and the Ether Type based on a load distribution key setting format.

The frame sending part 107 sends the frame assembled by the send information setting part 106 from the port designated by the load distribution key transfer processing part 105.

Next, description will be made of the function blocks of a receiving node according to the embodiment mode.

Figure 2:
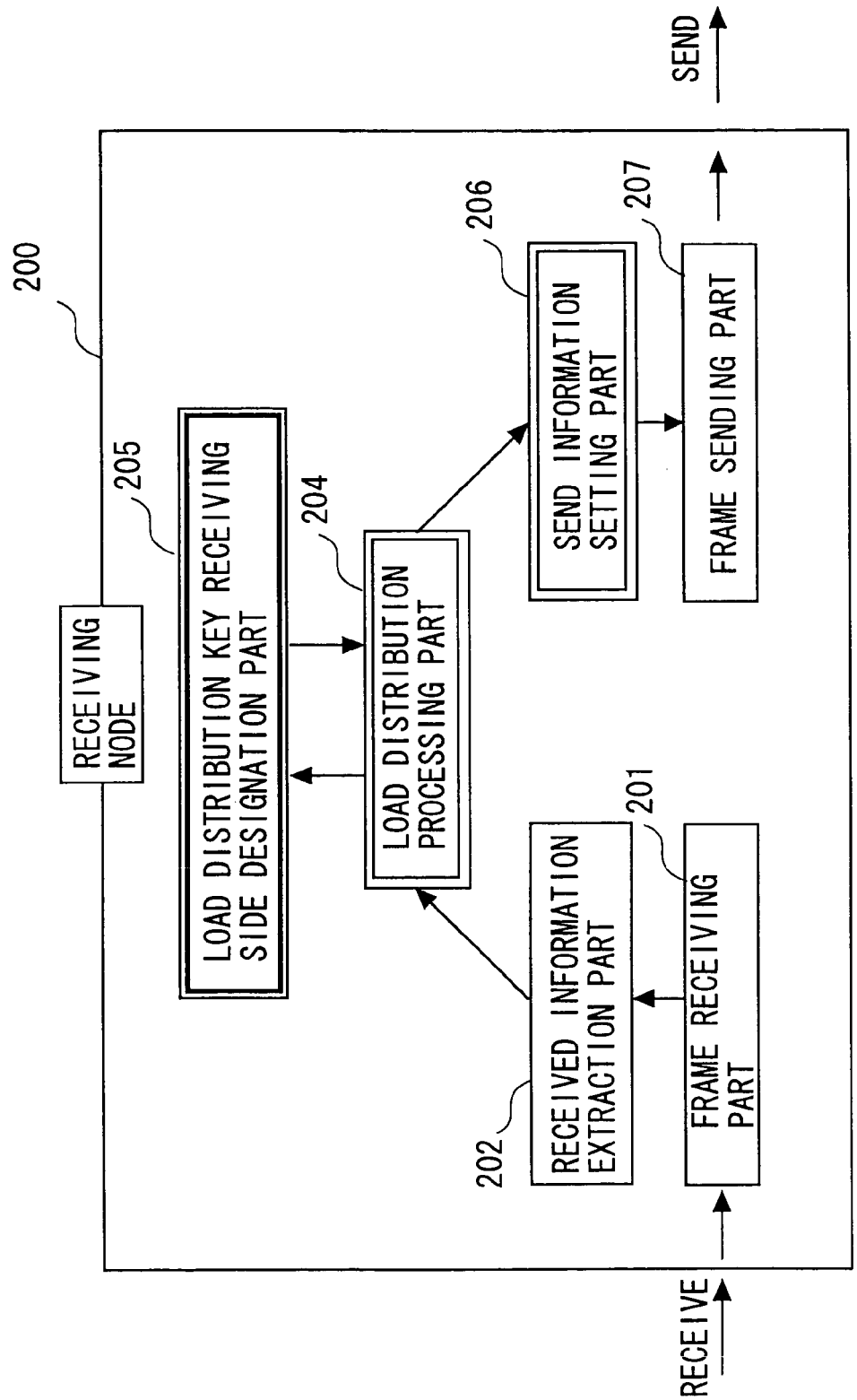
FIG. 2 is a function block diagram of a receiving node according to the embodiment mode of the invention.

FIG. 2 is a block diagram illustrating the functions of a receiving node 200. The receiving node 200 includes a frame receiving part 201, a receive information extraction part 202, a load distribution processing part 204, a load distribution key receiving side designation part 205, a send information setting part 206, and a frame sending part 207.

The frame receiving part 201 receives a frame sent to the receiving node 200. The frame received by the frame receiving part 201 is passed to the receive information extraction part 202 together with receiving port information that specifies a receiving port through which the frame has been received.

The receive information extraction part 202 extracts, from the received frame, destination MAC address information, VLAN information, and upper protocol information (if the sending node is a router or the like). The receive information extraction part 202 also searches a load distribution key receiving side information table described later for the Ether type of the frame using a receiving port as a search key. In the case where an Ether type is designated for the corresponding port, the Ether type is retrieved from the received frame. If the Ether type is found, a load distribution key is extracted and transferred to the load distribution processing part 204. Note that the receive information extraction part 202 corresponds to a search part and a received information extraction part according to the invention.

Figure 6:
FIG. 6 is an example of a load distribution key receiving side information table.

The load distribution key receiving side designation part 205 includes a memory. The load distribution key receiving side designation part 205 also stores in the memory a load distribution key receiving side information table 205a in which an Ether Type used for recognizing information between nodes transferring a frame containing a load distribution key is stored by relating to each receiving port. FIG. 6 shows an example of the load distribution key receiving side information table 205a.

Further, the load distribution key receiving side designation part 205 stores in the memory a receiving port, an Ether Type representing the load distribution key, and information indicating whether or not the load distribution key is to be transferred to another node (descendant station) other than a frame transfer destination, by relating to the receiving port as shown in the load distribution key receiving side information table 205a.

The load distribution processing part 204 executes a load distribution process (for example, Link Aggregation or ECMP (Equal Cost Multi-Path)). The load distribution processing part 204 calculates the load distribution key from the source MAC address of the received frame. The load distribution processing part 204 then specifies a physical route used for transferring the received frame.

Further, in the case where the load distribution key is received from the receive information extraction part 202, the load distribution processing part 204 determines the physical route by using the received load distribution key as it is without executing the calculation process for a load distribution key.

Furthermore, in addition to the process described above, the load distribution processing part 204 references the receiving port number of the frame to search the load distribution key receiving side information table 205a for the presence of a descendant station. If the load distribution key receiving side information table 205a contains a designation indicating that there is a transfer to a descendant station, the load distribution processing part 204 transfers the corresponding Ether type and the received load distribution key to the send information setting part 206. Note that the load distribution processing part 204 corresponds to a load distribution processing part and sending port specifying part according to the invention.

The send information setting part 206 structures an Ether frame to be sent to a descendant station based on the information from the load distribution processing part 204. An existing frame format generated by the send information setting part 206 is the same as the frame format 1 of FIG. 4 generated by the send information setting part 106. In the case where information has been received from the load distribution processing part 204, the send information setting part 206 also structures a frame to be sent based on the information. In that case, the send information setting part 206 structures the frame containing the Ether type transferred from the load distribution processing part 204 and the load distribution key based on the frame format 10 containing the load distribution key shown in FIG. 5.

The frame sending part 207 sends the frame assembled by the send information setting part 206 from the sending port designated by the load distribution processing part 204.

EXAMPLE 1

Next, description will be made of an example of a load distribution process for a frame in the case of using a communication terminal having functions of the sending node 100 and the receiving node 200 described above.

Figure 7:
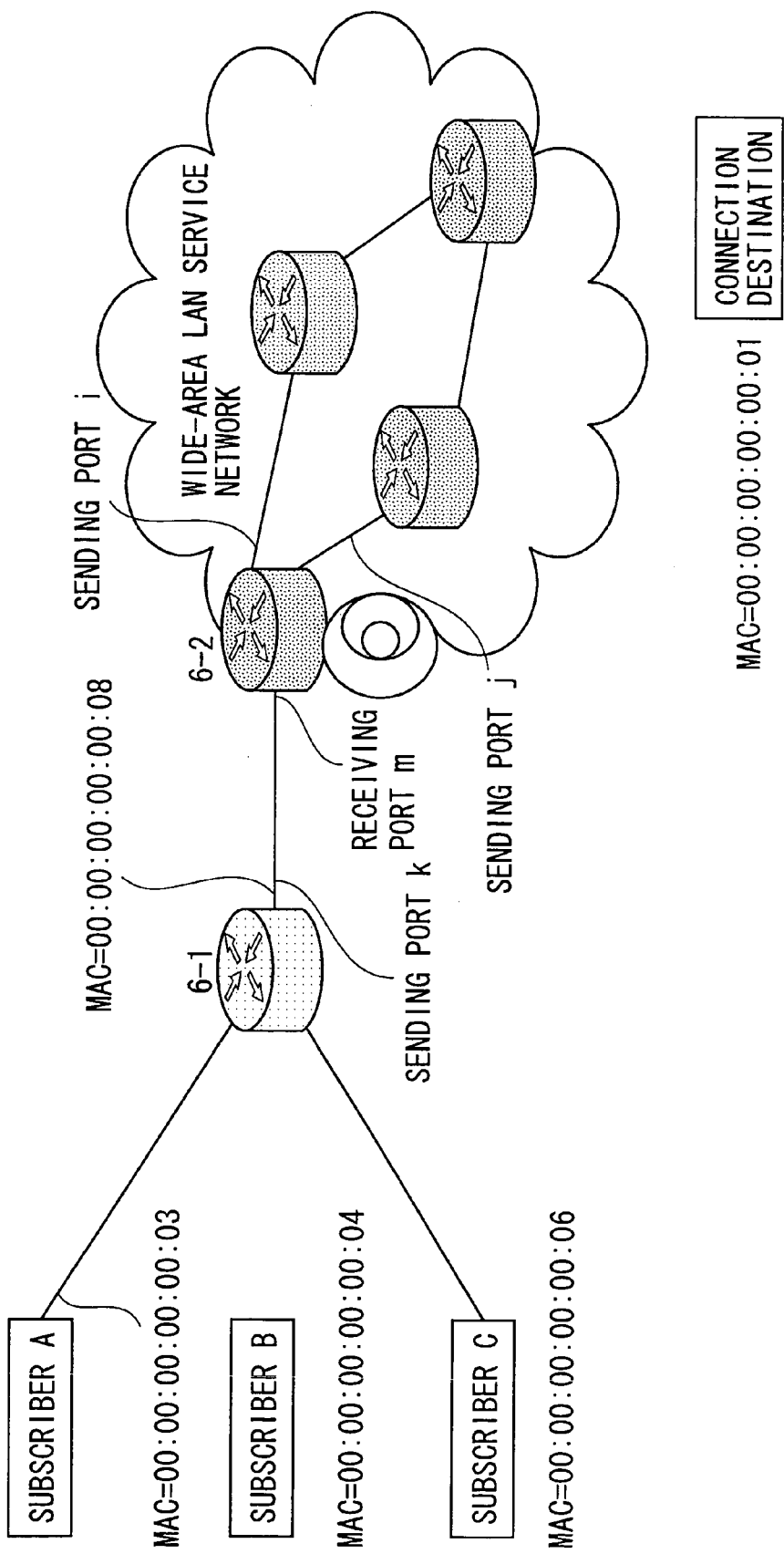
FIG. 7 is a connection configuration according to Example 1.

FIG. 7 shows a connection configuration of the communication terminal in the case of using a wide-area LAN network. In FIG. 7, the sending node 100 is denoted by 6-1. Also, the receiving node 200 is denoted by 6-2. Sending subscribers A, B, and C are subscribers under the node 6-1. Further, the subscribers A, B, and C are shown with examples of MAC addresses corresponding to the respective terminals.

Figure 8:
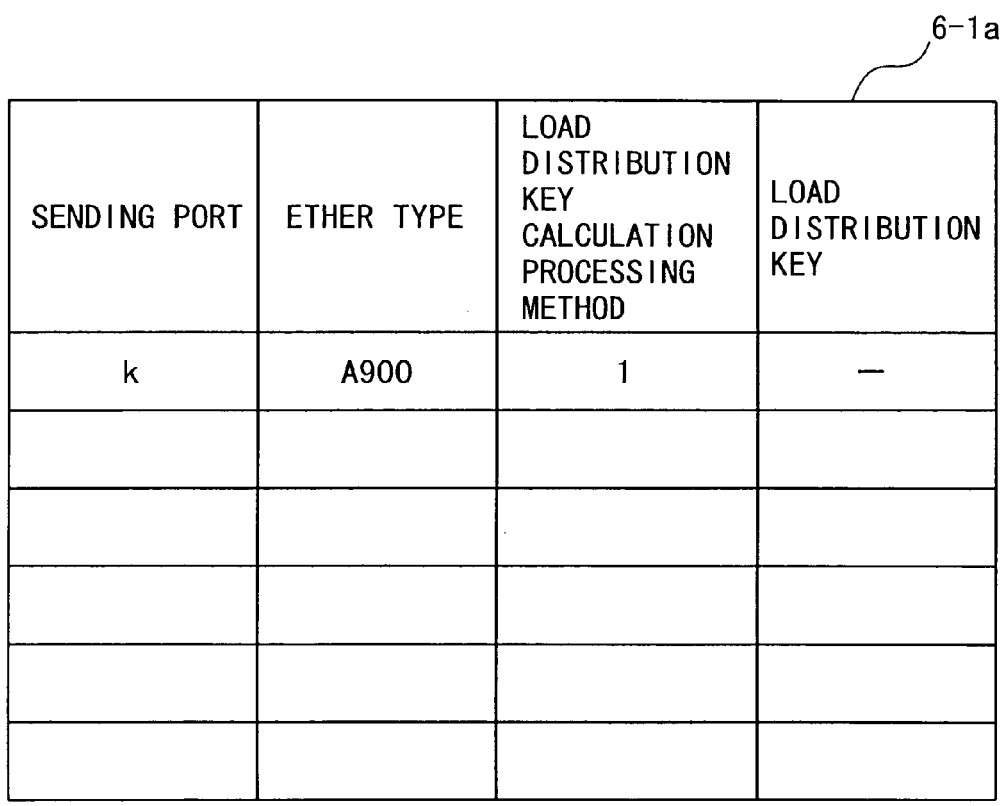
FIG. 8 is a load distribution key originating side information table setting example of a node 6-1 according to Example 1.

FIG. 8 shows a load distribution key originating side information table setting example 6-1a set for the node 6-1 by an operator of the wide-area LAN. FIG. 9 shows a load distribution key receiving side information table setting example 6-2a for the receiving side node 6-2 set by the operator of the wide-area LAN.

Similarly to the load distribution key originating side information table 104a, the load distribution key originating side information table setting example 6-1a of FIG. 8 stores an Ether Type corresponding to a sending port, a calculation method for a load distribution key, and a load distribution key. In Example 1, the load distribution key is not determined in advance, so that the table 6-1a stores no load distribution key.

Similarly to the load distribution key receiving side information table 205a, the load distribution key receiving side information table setting example 6-2a of FIG. 9 stores an Ether Type corresponding to a receiving port and information indicating whether or not a transfer is to be made to a descendant station. Note that in Example 1, it is not judged whether or not a transfer is to be made to a descendant station, the information indicating whether or not a transfer is to be made to a descendant station is left blank.

Further, FIG. 10 shows a load distribution route determination table 6-2b for the node 6-2. The load distribution route determination table 6-2b is set for the node 6-2. The node 6-2 has such a setting made in the load distribution route determination table 6-2b as to select a sending port i if the load distribution key is 0. The node 6-2 also has such a setting made in the load distribution route determination table 6-2b as to select a sending port j if the load distribution key is 1.

In Example 1, the load distribution calculating method is judged as to the execution content depending on whether the source MAC address is an even number or an odd number. In the load distribution key originating side information table setting example 6-1a of Example 1, the load distribution calculation processing method is registered as 1.

In the network as in Example 1, if the load distribution process according to the embodiment mode is not executed, the following process is executed. In the network, the MAC addresses of the terminals of the subscribers A, B, and C connected to the node 6-1 are all the MAC address of the node 6-1. Also, in the conventional load distribution process, packets are sorted according to the MAC address. That is, the source MAC addresses of the packets from the terminals of the subscribers A, B, and C received by the node 6-2 are all the MAC address of the node 6-1. Therefore, since the MAC address of the node 6-1 is an even number, all the packets from the terminals of the subscribers A, B, and C always have the sending port i selected upon determination of the route at the node 6-2.

In contrast, description will be made below of the case of executing a load distribution process using the sending node 100 and the receiving node 200 according to the embodiment mode.

The frame sent out from the terminal of the subscriber A is received by the node 6-1. On the node 6-1, the communication control part 103 determines a sending port k for the frame. After the sending port has been determined, the communication control part 103 transfers the frame to the load distribution key transfer processing part 105.

The load distribution key transfer processing part 105 references the load distribution key originating side information table setting example 6-1a to judge the load distribution calculation processing method for the frame. According to the load distribution key originating side information table 6-1a, the load distribution calculation processing method for the frame of the sending port k is designated as 1. Therefore, the load distribution key transfer processing part 105 references predetermined load distribution calculation processing methods (not shown) to learn the method corresponding to 1. As a result, based on the learned load distribution calculation processing method, the load distribution key transfer processing part 105 judges from the received frame information whether the source MAC address (MAC address of the terminal of the subscriber A) is an even number or an odd number. That is, if the source MAC address of the received frame is an odd number, the load distribution key transfer processing part 105 sets the load distribution key to 0, and if an odd number, sets the load distribution key to 1. In Example 1, since the MAC address of the terminal of the subscriber A is an odd number, the load distribution key is set to 1.

The load distribution key transfer processing part 105 transfers to the send information setting part 106 the load distribution key, "Ether Type=A900" obtained from the load distribution key originating side information table setting example 6-1a, and the frame assembly information (sending port information) determined by the communication control part 103.

Having found a load distribution key contained, the send information setting part 106 references the load distribution key to structure a frame according to the load distribution key setting format 1 shown in FIG. 5. Then the frame sending part 107 sends out the structured frame from the port k.

The frame sent out from the node 6-1 is received from the receiving port m of the node 6-2 serving as the receiving node 200.

The receive information extraction part 202 of the node 6-2 searches the load distribution key receiving side information table setting example 6-2a using the receiving port m as a search key. In that case, Ether Type is set to A900 in an entry corresponding to the receiving port m. Based on the retrieved information, the receive information extraction part 202 judges whether or not "Ether type=A900" obtained from the load distribution key receiving side information table 6-2a is set in the received frame.

If "Ether Type=A900" is set in the received frame, the receive information extraction part 202 extracts from the frame the load distribution key (1) transferred from the node 6-1. The receive information extraction part 202 then transfers the load distribution key to the load distribution processing part 204. If "Ether Type=A900" is not set in the received frame, the receive information extraction part 202 notifies the load distribution processing part 204 to that effect. Then, if "Ether Type=A900" is not set in the received frame, the load distribution processing part 204 performs a load distribution calculation according to the predetermined load distribution calculation processing method.

In the case of Example 1, "load distribution key=1" can be extracted based on "Ether Type=A900" of the frame. Therefore, the load distribution processing part 204 searches the load distribution route determination table 6-2b for "load distribution key=1" from the receive information extraction part 202. After the search, since the load distribution key is 1, the load distribution processing part 204 determines the sending port j for the frame.

Similarly, in the frame from the subscriber B, since the MAC address of the subscriber B is an even number, the load distribution key transfer processing part 105 references the load distribution calculation processing method to find the load distribution key being 0. The frame in which the load distribution key is defined is passed from the sending node 6-1 to the receiving node 6-2. Then, similarly to the frame from the node 6-1, the receive information extraction part 202 of the node 6-2 extracts "load distribution key=0" based on the Ether Type of the received frame, and the load distribution processing part 204 searches the load distribution route determination table 6-2b of FIG. 9 to thereby determine the sending port i. Alternatively, if the Ether Type is not set in the received frame, the load distribution processing part 204 performs the load distribution calculation process for the frame.

Accordingly, in Example 1, the sending node 100 and the receiving node 200 are used to perform the load distribution process, so that the load distribution reflecting the actual information on the subscribers A and B can be executed on the node 6-2. Therefore, according to Example 1, the desired load distribution becomes possible.

EXAMPLE 2

Next, description will be made of another example different from Example 1 of a load distribution process for a frame in the case of using a communication terminal having functions of the sending node 100 and the receiving node 200 described above.

Figure 11:
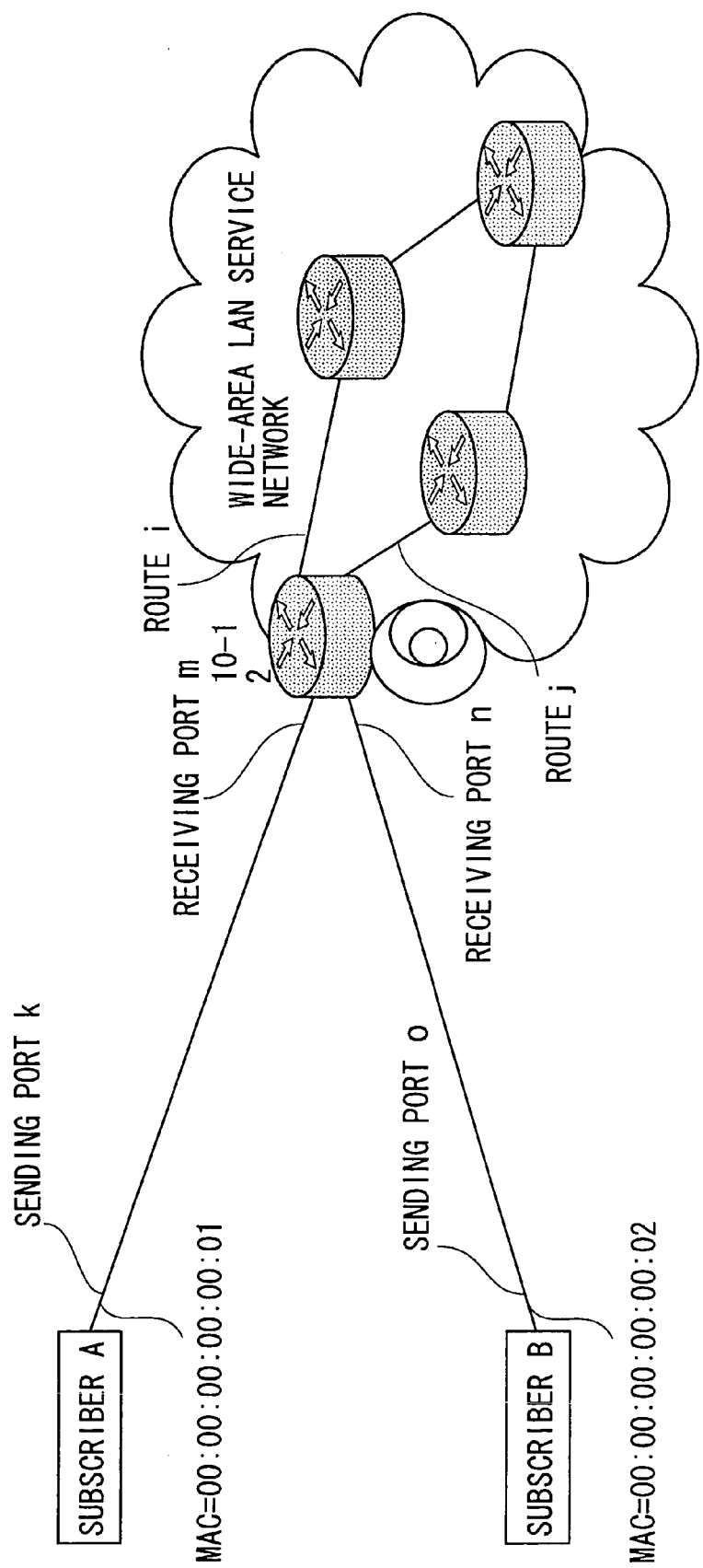
FIG. 11 is a connection configuration according to Example 2.

FIG. 11 shows a connection configuration of the communication terminal in the case of using the wide-area LAN network in Example 2. In Example 2, the sending node 100 is represented by the subscriber A and the subscriber B. Also, the receiving node 200 is denoted by 10-1.

Figure 12:
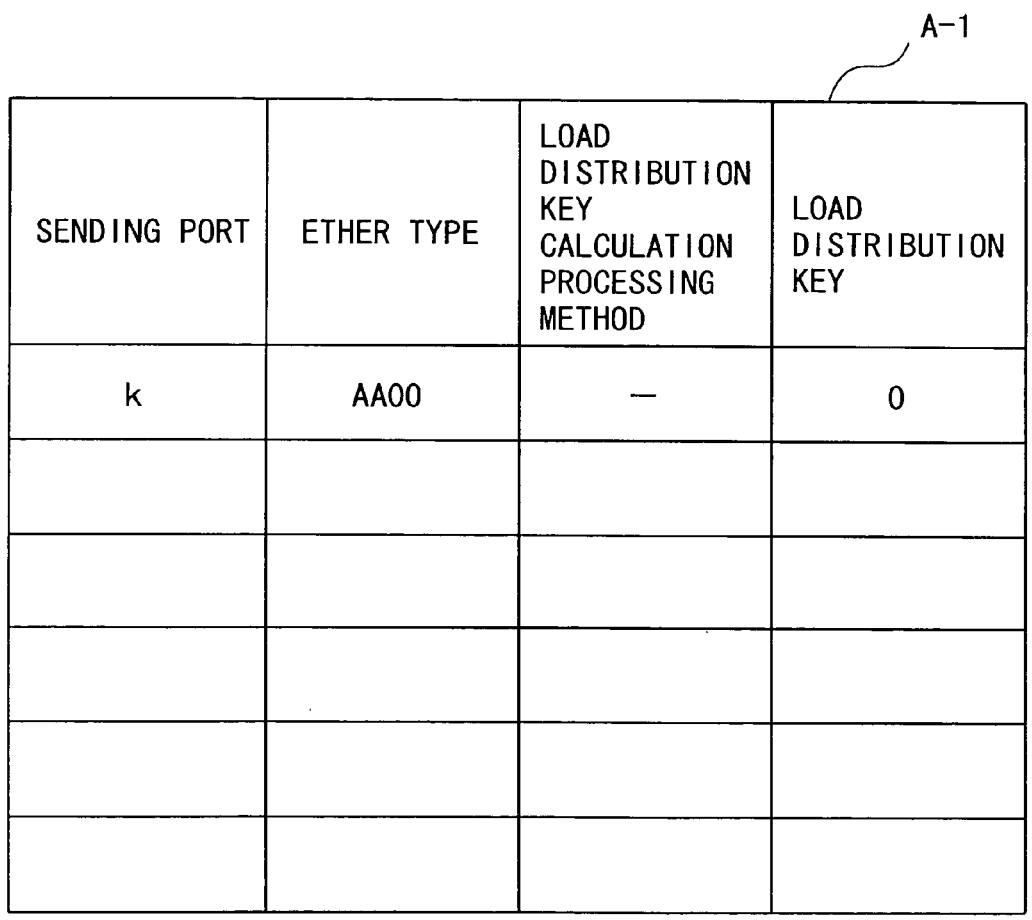
FIG. 12 is a load distribution key originating side information table setting example of a terminal of a subscriber A according to Example 2.

Information set for the terminal of the subscriber A by the operator of the wide-area LAN is represented by a load distribution key originating side information table setting example A-1 shown in FIG. 12. Also, information set for the terminal of the subscriber B by the operator is represented by a load distribution key originating side information table setting example B-1 shown in FIG. 13. Further, a load distribution key receiving side information table setting example 10-1a shown in FIG. 14 is set for a receiving node 10-1.

Further, a load distribution route determination table 10-1b shown in FIG. 15 is set for the node 10-1. The load distribution route determination table 10-1a has such a setting as to select the sending port i for the node 10-1 if the load distribution key is 0. Also, the load distribution route determination table 10-1a has such a setting as to select the sending port i for the node 10-1 if the load distribution key is 1. That is, the operator intends to cause the traffic for the subscriber A to flow along a route i by using the settings. Also, the operator intends to cause the traffic for the subscriber B to flow along a route j by using the settings.

When the frame is sent from the subscriber A, the communication control part 103 within the terminal of the subscriber A determines the sending port k. Based on the sending port k, the load distribution key transfer processing part 105 references the load distribution key originating side information table setting example A-1 to set the load distribution key of the frame to 0.

The load distribution key transfer processing part 105 transfers to the send information setting part 106 the load distribution key, "Ether Type=AA00" obtained from the load distribution key originating side information table setting example A-1, and the frame assembly (sending port) determined by the communication control part 103.

Since the load distribution key has been transferred from the load distribution key transfer processing part 105, the send information setting part 106 structures a frame according to the load distribution key setting format 1. After the frame is structured, the frame sending part 107 sends out the frame from the port k.

The sent out frame is received by the receiving port m of the node 10-1. The received information extraction part 202 searches the load distribution key receiving side information table setting example 10-1a for the receiving port m. Then, "Ether type=AA00" obtained as a search result is retrieved from the received frame. After the retrieval of "Ether type=AA00", the receive information extraction part 202 extracts the load distribution key 0.

The load distribution processing part 204 searches the load distribution route determination table 10-1a based on the load distribution key 0 extracted by the receive information extraction part 202. As a result of the search, the load distribution processing part 204 determines the sending port i for the frame of k.

Similarly to the terminal of the subscriber A, as to the frame from the terminal of the subscriber B, the load distribution key 1 and "Ether Type=AA00" are obtained from the load distribution key originating side information table setting example B-1 upon origination. Therefore, by the same procedure as the terminal of the subscriber A, the node 10-1 searches the load distribution route determination table 10-1a to determine the sending port j.

Accordingly, Example 2 allows the load distribution intended by the operator to be executed on the node 10-1. Therefore, the sending node 100 and the receiving node 200 can be used to perform the desired load distribution.

EXAMPLE 3

Next, description will be made of another example different from Examples 1 and 2 of a load distribution process for a frame in the case of using a communication terminal having functions of the sending node 100 and the receiving node 200 described above.

Figure 16:
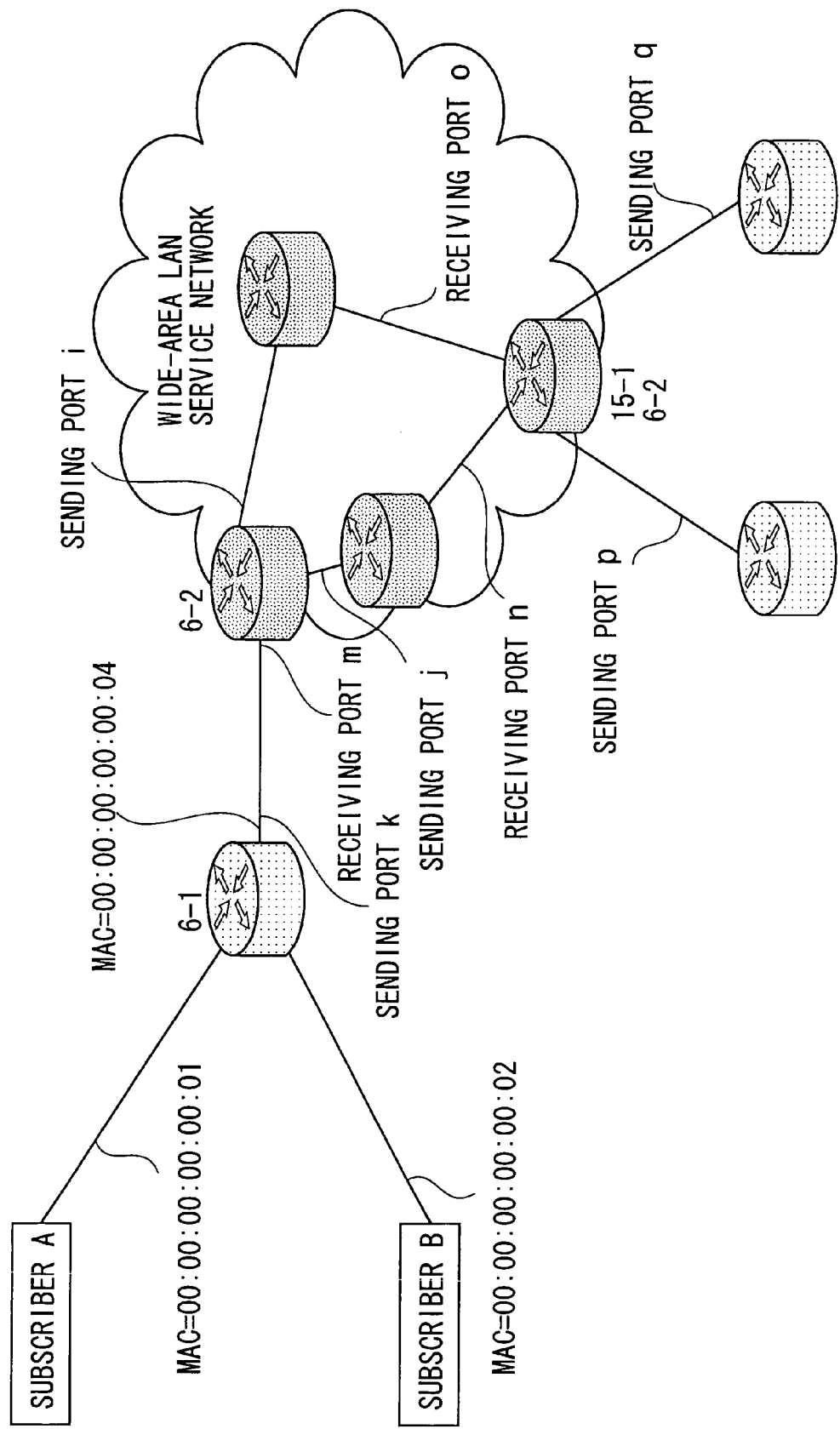
FIG. 16 is a connection configuration according to Example 3.

FIG. 16 shows a connection configuration of the communication terminal in the case of using the wide-area LAN network in Example 3.

In Example 3, a node 15-1 for performing load distribution is added to the configuration shown in Example 1. As to other structural elements, the sending node 100 is denoted by 6-1, and the receiving node 200 is denoted by 6-2 and 15-1. Also, the terminals of the subscribers A and B are under the node 6-1. In addition, examples of MAC addresses are indicated for respective terminals.

Information set for the node 6-1 by an operator of the wide-area LAN is represented by the load distribution key originating side information table setting example (6-1a) shown in FIG. 8. Also, information set for the node 6-2 by the operator of the wide-area LAN is represented by a load distribution key receiving side information table setting example 6-2c shown in FIG. 17.

Further, the load distribution route determination table (6-2a) shown in FIG. 10 is set for the node 6-2. The load distribution route determination table (6-2a) has such a setting as to select the sending port i if the load distribution key is 0. Also, the load distribution route determination table (6-2a) has such a setting as to select the sending port j if the load distribution key is 1.

In Example 3, the load distribution calculating method is executed by different methods depending on whether the source MAC address is an even number or an odd number. In the load distribution key originating side information table setting example (6-1a), the load distribution calculation processing method is registered as 1.

Set for the node 15-1 are a load distribution key receiving side information table setting example 15-1a shown in FIG. 18 and a load distribution route determination table 15-1b shown in FIG. 19.

As shown in Example 1, on the node 6-2, according to the MAC addresses of the terminals of the subscribers A and B, the routes for frames from the respective terminals are determined. Therefore, Example 3 describes process performed after the routes are determined on the node 6-2 in Example 1.

With regard to the frame from the subscriber A, the send information setting part 206 of the node 6-2 obtains information indicating that the sending port for the frame determined by the load distribution processing part 204 is i. Also, having found that the receiving port is m, the send information setting part 206 searches the load distribution key receiving side information table setting example 6-2c of FIG. 17. As a result of the search, the send information setting part 206 obtains information indicating that "a transfer is to be made to a descendant station" from the load distribution key receiving side information table setting example 6-2c. The send information setting part 206 then structures a frame according to the load distribution key setting format 1 based on the received load distribution key and "Ether Type=A900" and the information on the frame for a transfer to a descendant station which are obtained from the load distribution key receiving side information table setting example 6-2c of FIG. 17. After the frame is structured, the frame sending part 207 transfers the load distribution key 1 to the descendant station.

The descendant station node 15-1 performs the same process as the node 6-2 to obtain the load distribution key 1. Then, the descendant station node 15-1 determines a sending port q for the frame from the load distribution route determination table 15-1b of FIG. 18.

Note that Example 3 describes the configuration having two load distribution nodes within a network, but the same operation is possible even with the increased number of the load distribution nodes by performing the process of the example.

Accordingly, Example 3 allows the load distribution key to be sent to/received from a plurality of nodes including the originating side node 6-1 and the receiving side nodes 6-2 and 15-1. According to Example 3, at a plurality of points within the network, it is possible to execute the load distribution, from which a sufficient statistical multiplexing effect is produced using the load distribution key obtained from the node 6-1, on a plurality of nodes.

(Modified Example)

In Examples 1, 2, and 3, for simplification of description, a load distribution key is calculated according to whether the source MAC address is an even number or an odd number. However, the invention does not define a calculation algorithm of the load distribution, and may therefore include the same load distribution algorithm as that of the existing load distribution node (for example, the node 6-2 in Example 1). That is the issue resides in a method of implementing the device.

Therefore, according to the process of the example, even in a complicate network, the accurate load distribution process is possible by transferring the load distribution key calculated on the node capable of calculating a load distribution key with the same method.

(Effects of the Embodiment Mode)

According to the communication terminal provided with the functions of the sending node 100 and the receiving node 200, there can be obtained effects, for example, as follows.

According to the embodiment mode, even in the case where there is a router on the subscriber side in the wide-area LAN network, the load distribution owing to sufficient statistical multiplex can be obtained on the load distribution node provided on the wide-area LAN network side. Accordingly, the embodiment mode eliminates the need for securing a redundant transfer bandwidth and allows effective network management.

Further, in the embodiment mode, information is sent/received between nodes, thereby making it sufficient that the functions of the sending node 100 and the receiving node 200 are provided only to the nodes that requires the functions. That is, according to the embodiment mode, nodes at some midpoints may basically have the existing configuration. Accordingly, the embodiment mode can suppress the costs for introducing an accurate load distribution process.

As described above, according to the invention, there can be provided a technique which allows a load distribution process for frames in a communication network to be implemented with efficiency and accuracy. Further, according to the invention, there can be provided a technique which allows a process corresponding to each individual user to be implemented with accuracy upon a load distribution process for frames in a communication network. Further, according to the invention, there can be provided a technique which allows a load distribution process for frames in a communication network to be implemented while various costs required for equipment investments and the like are suppressed.

What is claimed is:

1. A communication terminal which sends a frame to another terminal when performing a load distribution process using load distribution information appended to a frame that is sent/received between terminals within a communication network, the communication terminal comprising:

a communication control part that specifies a sending port used for sending the frame;

a load distribution information originating side designation part that stores load distribution structuring information, by relating to a sending port, wherein the load distribution structuring information is used for generating the load distribution information which is to be appended to the frame;

a load distribution information transfer processing part that, when the sending port is specified, retrieves the load distribution structuring information corresponding to the determined sending port from the load distribution information originating side designation part;

a load distribution information determination processing part that calculates load distribution information, which defines a load distribution process to be performed on another terminal, based on the load distribution structuring information;

a send information setting part that structures the frame based on the load distribution structuring information and a load distribution information setting format; and a send frame processing part that sends out the structured frame from the sending port.

2. A communication terminal according to claim 1, wherein the load distribution structuring information includes (i) identification information, which is to be appended to a frame together with the load distribution information and specifies the load distribution information on the frame and (ii) information indicating a method of calculating the load distribution information.

3. A communication terminal according to claim 1, wherein the load distribution structuring information includes (i) identification information, which is to be appended to a frame together with the load distribution information and specifies the load distribution information on the frame and (ii) load distribution information to be sent to the other terminal.

4. A communication terminal which receives a frame from another terminal when performing a load distribution process using load distribution information appended to a frame that is sent/received between terminals within a communication network, the communication terminal comprising:
   a load distribution information receiving side designation part that previously stores identification information, which specifies load distribution information of the received frame, by relating to a receiving port;
   a retrieval part that retrieves, based on the receiving port through which a frame has been received, identification information corresponding to the frame which is stored in the load distribution information receiving side designation part;
   a received information extraction part that, when the identification information is set in the frame, extracts the load distribution information specified by the identification information from within the received frame;
   a load distribution processing part that, when the identification information is not set in the frame, calculates load distribution information based on a predetermined load distribution calculation method; and
   sending port specifying part that, when the frame is sent to a descendant terminal, specifies a sending port of the frame based on the load distribution information.

5. A communication terminal according to claim 4, wherein the load distribution information receiving side designation part includes transfer permission information that indicates whether or not load distribution information contained in the received frame is transferred together with the frame to a descendant terminal, and
   wherein the load distribution processing part sets, based on the transfer permission information, the load distribution information to a frame to be transferred to the descendant terminal.

6. A communication terminal which sends a frame to another terminal when performing a load distribution process using load distribution information appended to a frame that is sent/received between terminals within a communication network, the communication terminal comprising:
   a communication control part that specifies a sending port used for sending the frame upon sending the frame;
   a load distribution information originating side designation part that stores load distribution structuring information, by relating to a sending port, wherein the load distribution structuring information is used for cienerating the load distribution information which is to be appended to the frame;
   a load distribution information transfer processing part that, when the sending port is specified, retrieves the load distribution structuring information corresponding to the determined sending port from the load distribution information originating side designation part;
   a load distribution information determination processing part that calculates load distribution information, which defines a load distribution process to be performed on another terminal, based on the load distribution structuring information;
   a send information setting part that structures the frame based on the load distribution structuring information and a load distribution information setting format; and
   a send frame processing part that sends out the structured frame from the sending port; and
   upon receiving the frame,
   a load distribution information receiving side designation part that previously stores identification information, which specifies load distribution information of the received frame, by relating to a receiving port;
   a retrieval part that retrieves, based on the receiving port, identification information corresponding to the frame which is stored in the load distribution information receiving side designation part;
   a received information extraction part that, when the identification information is set in the frame, extracts the load distribution information specified by the identification information from within the received frame;
   a load distribution processing part that, when the identification information is not set in the frame, calculates load distribution information based on a predetermined load distribution calculation method; and
   a sending port specifying part that, when the frame is sent to a descendant terminal, specifies a sending port of the frame based on the load distribution information.

7. A communication terminal according to claim 6, wherein the load distribution structuring information includes (i) identification information, which is to be appended to a frame together with the load distribution information and specifies the load distribution information on the frame and (ii) information indicating a method of calculating the load distribution information.

8. A communication terminal according to claim 6, wherein the load distribution structuring information includes (i) identification information, which is to be appended to a frame together with the load distribution information and specifies the load distribution information on the frame and (ii) load distribution information to be sent to the other terminal.

9. A communication terminal according to claim 6, wherein the load distribution information receiving side designation part includes transfer permission information that indicates whether or not load distribution information contained in the received frame is transferred together with the frame to a descendant terminal, and
   wherein the load distribution processing part sets based on the transfer permission information, the load distribution information to a frame to be transferred to the descendant terminal.

10. A load distribution method of performing a load distribution process using load distribution information appended to a frame that is sent/received between terminals within a communication network, the load distribution method causing a computer to perform the steps of:
    specifying a sending port used for sending the frame based on load distribution structuring information, wherein the load distribution structuring information is used for generating the load distribution information which is to be appended to the frame;
    when the sending port is specified, retrieving the load distribution structuring information corresponding to the determined sending port from the load distribution information originating side designation part;
    calculating load distribution information, which defines a load distribution process to be performed on another terminal, based on the load distribution structuring information;
    structuring the frame based on the load distribution structuring information and a load distribution information setting format; and
    sending out the structured frame from the sending port.

11. A load distribution method according to claim 10, wherein the load distribution structuring information includes (i) identification information, which is to be appended to a frame together with the load distribution information and specifies the load distribution information on the frame and (ii) information indicating a method of calculating the load distribution information.

12. A load distribution method according to claim 10, wherein the load distribution structuring information includes (i) identification information, which is to be appended to a frame together with the load distribution information and specifies the load distribution information on the frame and (i) load distribution information to be sent to the other terminal.

13. A load distribution method of performing a load distribution process using load distribution information appended to a frame that is sent/received between terminals within a communication network, the load distribution method causing a computer to perform the steps of:

previously storing identification information, which specifies load distribution information of the received frame, by relating to a receiving port;

retrieving, based on the receiving port through which a frame has been received, identification information corresponding to the frame which is stored in the load distribution information receiving side designation part;

when the identification information is set in the frame, extracting the load distribution information specified by the identification information from within the received frame;

when the identification information is not set in the frame, calculating load distribution information based on a predetermined load distribution calculation method; and when the frame is sent to a descendant terminal, specifying a sending port of the frame based on the load distribution information.

14. The load distribution method according to claim 13, wherein the load distribution information receiving side designation part includes transfer permission information that indicates whether or not load distribution information contained in the received frame is transferred together with the frame to a descendant terminal, the load distribution method further comprising the step of using the transfer permission information to set the load distribution information to a frame to be transferred to the descendant terminal.

15. A computer readable storage medium stored with a load distribution processing program for causing a load distribution process to be performed using load distribution information appended to a frame that is sent/received between terminals within a communication network, the load distribution processing program causing a computer to perform the steps of:

specifying a sending port used for sending the frame based on load distribution structuring information, wherein the load distribution structuring information is used for generating the load distribution information which is to be appended to the frame;

when the sending port is specified, retrieving the load distribution structuring information corresponding to the determined sending port from the load distribution information originating side designation part;

calculating load distribution information, which defines a load distribution process to be performed on another terminal, based on the load distribution structuring information;

structuring the frame based on the load distribution structuring information and a load distribution information setting format; and sending out the structured frame from the sending port.

16. A computer readable storage medium stored with a load distribution processing program according to claim 15, wherein the load distribution structuring information includes (i) identification information, which is to be appended to a frame together with the load distribution information and specifies the load distribution information on the frame and (ii) information indicating a method of calculating the load distribution information.

17. A computer readable storage medium stored with a load distribution processing program according to claim 15, wherein the load distribution structuring information includes (i) identification information, which is to be appended to a frame together with the load distribution information and specifies the load distribution information on the frame and (ii) load distribution information to be sent to the other terminal.

18. A computer readable storage medium stored with a load distribution processing program for causing a load distribution process to be performed using load distribution information appended to a frame that is sent/received between terminals within a communication network, the load distribution processing program causing a computer to perform the steps of:

previously storing identification information, which specifies load distribution information of the received frame, by relating to a receiving port;

retrieving, based on the receiving port through which a frame has been received, identification information corresponding to the frame which is stored in a load distribution information receiving side designation part;

when the identification information is set in the frame, extracting the load distribution information specified by the identification information from within the received frame;

when the identification information is not set in the frame, calculating load distribution information based on a predetermined load distribution calculation method; and when the frame is sent to a descendant terminal, specifying a sending port of the frame based on the load distribution information.

19. A computer readable storage medium stored with a load distribution processing program according to claim 18, wherein the load distribution information receiving side designation part includes transfer permission information that indicates whether or not load distribution information contained in the received frame is transferred together with the frame to a descendant terminal, and the load distribution processing program further causes the computer to perform the step of using the transfer permission information to set the load distribution information to a frame to be transferred to the descendant terminal.

* * * * *